United States Patent [19]
Briggs et al.

[11] Patent Number: 5,386,487
[45] Date of Patent: Jan. 31, 1995

[54] APPARATUS FOR MAINTAINING PLUG ASSEMBLIES OF OPTICAL FIBER CONNECTORS IN A SIDE BY SIDE RELATION WITH FLOAT THEREBETWEEN

[75] Inventors: Robert C. Briggs, Newport; Thomas R. Fawcett, Jr., Harrisburg; Randy M. Manning, New Cumberland, all of Pa.

[73] Assignee: The Whitaker Corporation, Wilmington, Del.

[21] Appl. No.: 227,933

[22] Filed: Apr. 15, 1994

Related U.S. Application Data

[63] Continuation-in-part of Ser. No. 127,220, Sep. 27, 1993, abandoned.

[51] Int. Cl.[6] ............................................. G02B 6/36
[52] U.S. Cl. .......................................... 385/59; 385/78; 385/89
[58] Field of Search ................ 385/55, 56, 58, 59, 385/71, 75, 76, 77, 78, 88, 89

[56] References Cited

U.S. PATENT DOCUMENTS

| | | | |
|---|---|---|---|
| 4,953,929 | 9/1990 | Basista et al. | 385/55 |
| 5,076,656 | 12/1991 | Briggs et al. | 385/71 |
| 5,121,454 | 6/1992 | Iwano et al. | 385/59 X |
| 5,123,071 | 6/1992 | Mulholland et al. | 385/53 |
| 5,222,168 | 6/1993 | Saito et al. | 385/59 |
| 5,293,581 | 3/1994 | DiMarco | 385/76 |

*Primary Examiner*—John D. Lee
*Attorney, Agent, or Firm*—June B. Schuette

[57] ABSTRACT

An apparatus to form a duplex-like fiber optic connector by maintaining plug assemblies in a side-by-side relation to enable simultaneous mating with sleeves of a receptacle housing. The apparatus has a pair of separate housings, each housing having a chamber where one of the plug assemblies is retainably received. A retention member is incorporated into one of the housings and a clasp member is incorporated into the other of the housings. The clasp member and the retention member are retainably interconnected to hold the housings in a side-by-side relationship with float therebetween, whereby the float accommodates any misalignment between the plug assemblies and the sleeves.

16 Claims, 9 Drawing Sheets

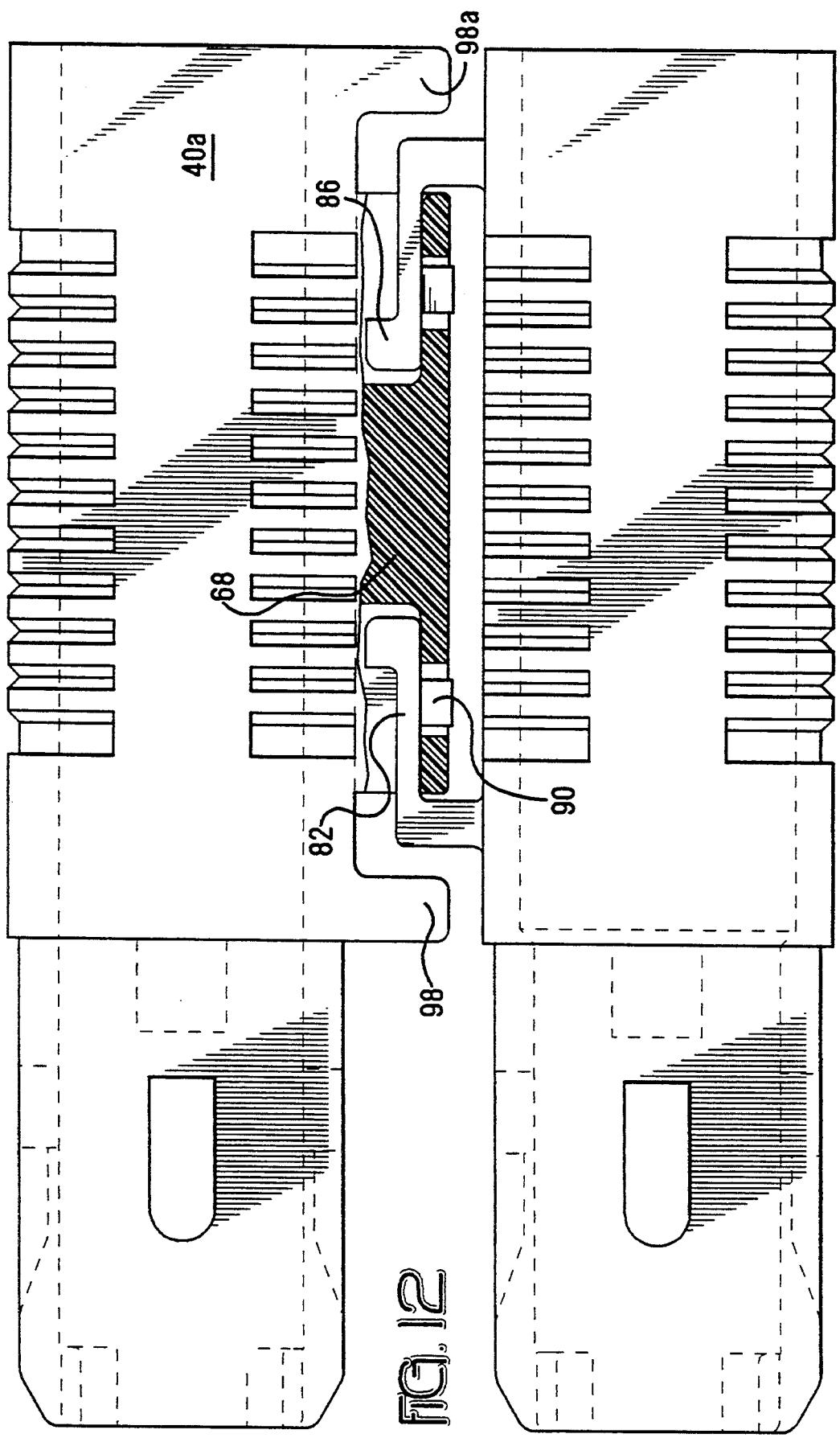

APPARATUS FOR MAINTAINING PLUG ASSEMBLIES OF OPTICAL FIBER CONNECTORS IN A SIDE BY SIDE RELATION WITH FLOAT THEREBETWEEN

This application is a continuation in part of application Ser. No. 08/127,220, filed Sep. 27, 1993 now abandoned.

FIELD OF THE INVENTION

This invention relates to optical fiber connectors and more particularly to an apparatus for interconnecting plug assemblies in a side-by-side relationship to form a duplex-like connector assembly that permits simultaneous coupling and uncoupling of the plug assemblies.

BACKGROUND OF THE INVENTION

In simple two station fiber optic communication systems, an optical signal is transmitted along an optical fiber from a transmission device, such as a LASER or a LED, at one of the stations, and a receiving device, such as a photodetector, at the other station. In order to achieve maximum transmission efficiency, the longitudinal axis of the optical fiber must be precisely aligned with the optical axis of the electro-optic devices. Additionally, where the distances between the transmission device and the receiving device are long, multiple lengths of optical fiber are often connected together. The longitudinal axis of these lengths of fiber must also be precisely aligned to achieve maximum signal transmission.

The alignment of one optical fiber with another optical fiber or electro-optic device is achieved through the use of an optical fiber connector. These connectors have a plug assembly that contains a fiber optic ferrule for precisely positioning the end of the optical fiber. Typically, the ferrule has a precision cylindrical outer surface and a concentric bore for receiving the end of the optical fiber therein. When optical fibers are to be connected together or the fibers are to be connected to an electro-optic device, the ferrules are received within a precision sleeve to establish the precise axial alignment required. In order to maintain the plug assembly with the sleeve, there are various configurations of fiber optic connectors, including connectors that screw-on, bayonet lock or engage by a push-pull mechanism.

In more complex communications systems, the two stations communicate back-and-forth with each other. For this type of system, it is most efficient to have a pair of optical fibers running between stations, where one fiber handles the transmission from the first station to the second and the other fiber handles the transmission from the second station to the first. This enables signals to be transmitted simultaneously in both directions, thereby increasing the speed of the system.

In order to conveniently manage the corresponding optical fibers there are a number of connectors, called duplex connectors, that incorporate a pair of ferrules into a single housing. It is often difficult to establish the proper axial alignment needed to maximize signal transmission when using duplex connectors due to the manufacturing inaccuracies within the single housing, the mating interface which is normally a pair of sleeves fixed rigidly relative to each other, and in the plug assembly itself. Additionally, duplex connectors utilize components specific to that particular connector configuration, thereby making it difficult for manufacturers and end-users to take advantage of the economies of scale that could be recognized if essentially the same components were used in both simplex (single ferrule connectors) and duplex connectors.

An example of such an apparatus that attempts to address these problems is disclosed in Mulholland et at, U.S. Pat. No. 5,123,071 wherein two individual simplex connectors are retained in a overconnector that has a bipartite body that defines compartments for receiving the exterior profile of the individual connectors. However, the overconnector holds the two simplex connectors in a fixed relation, thereby preventing accommodation of misalignment between the mating components. Any float between the simplex connectors being achieved by retaining the connectors in a loose manner.

Another example of an adaptor that permits a pair of simplex connectors to function as a duplex-like connector is disclosed in Basista, et al, U.S. Pat. No. 4,953,929. The adapter retains two simplex connectors in respective clamping portions that are interconnected by a resilient means to accommodate misalignment during mating. However, the resilient means disclosed only provides for independent translational float along one of the two axes that are perpendicular to the longitudinal axis of the optical fiber and ferrule.

What is still needed is an apparatus for maintaining a pair of plug assemblies in a corresponding side-by-side alignment with translational float along each of the axes perpendicular to the longitudinal axis of the ferrule in order to accommodate misalignment due to manufacturing tolerances and assure the proper alignment necessary for maximum signal transmission.

SUMMARY OF THE INVENTION

The present invention is an interconnect assembly for maintaining plug assemblies of optical fiber connectors in a side-by-side relation with float therebetween to accommodate any misalignment with a mating receptacle housing. The assembly comprises a pair of separate housings, each housing having a chamber for retainably receiving one of the plug assemblies. A first housing has a retention member. A second housing has a clasp member. The clasp member engages the retention member to hold the housings in a side-by-side relationship such that the housings may float relative to each other.

It is an object of this invention to provide an apparatus for holding plug assemblies from optical fiber connectors in a corresponding side-by-side relationship with float therebetween.

It is a feature of this invention that the plug assemblies are retained in housings and a first housing having a retention member retainably engages a second housing having a clasp member so that the housings may float relative to each other, thereby providing float between adjacent plug assemblies. It is another feature of this invention that a detent may be incorporated into either the retention member or the clasp member to maintain the interconnection of the housings.

It is an advantage of this invention that the float between the housings occurs independently along two axes that are perpendicular to each other and perpendicular to the longitudinal axis of a ferrule within the plug assembly.

A further understanding of the invention and its advantages may be realized by reference to the remaining portions of the specification and the included drawings,

BRIEF DESCRIPTION OF THE DRAWINGS

The invention will now be described by way of example with reference to the accompanying drawings in which:

FIG. 12 is a side elevational view of a first housing with a rear bumper united with a second housing.

DESCRIPTION OF THE PREFERRED EMBODIMENT

Figure 1:
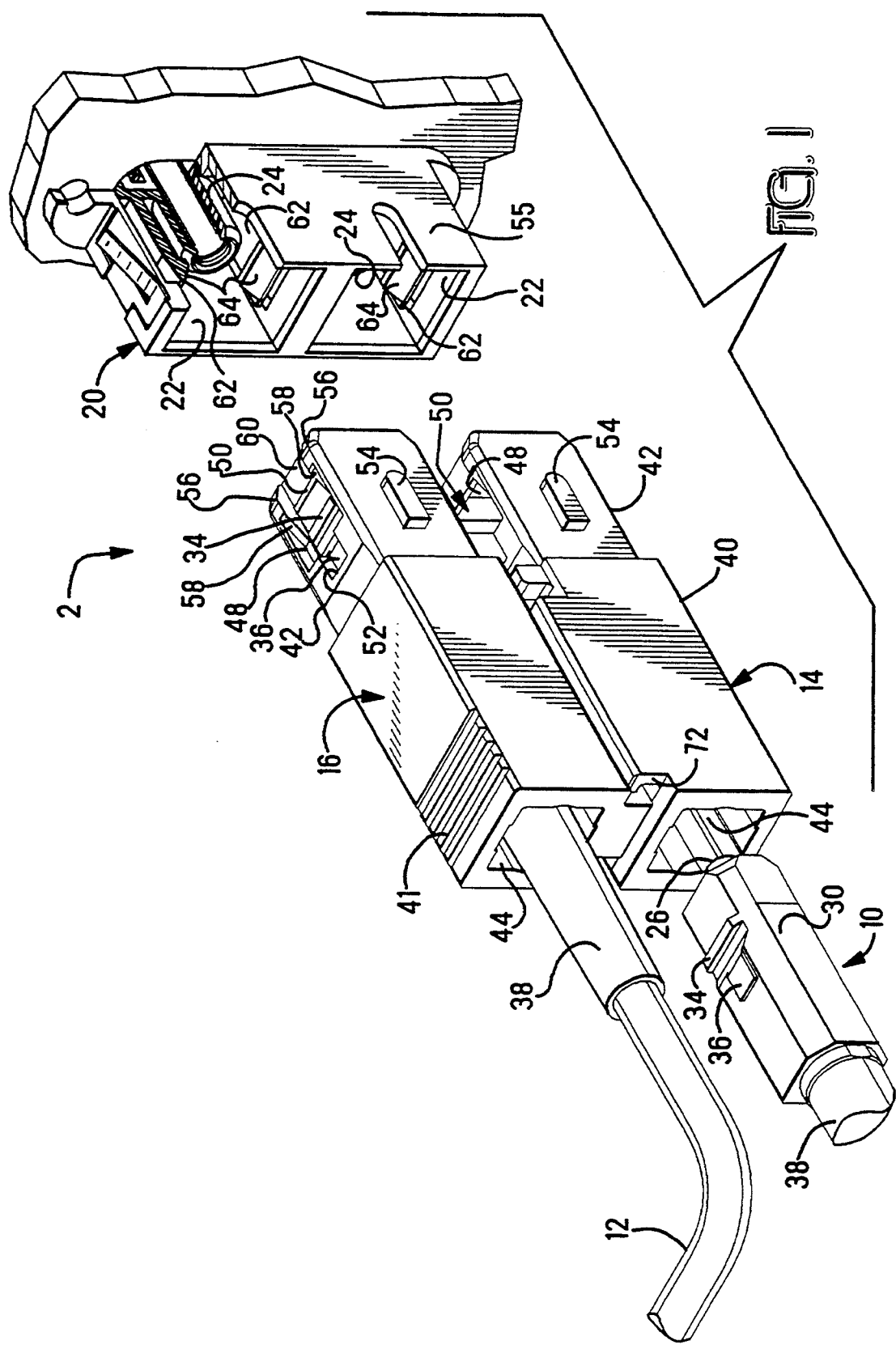
FIG. 1 is a partially-exploded and partially cutaway perspective view of a duplex-like connector of the present invention that is to be connected to a receptacle housing.
Figure 2:
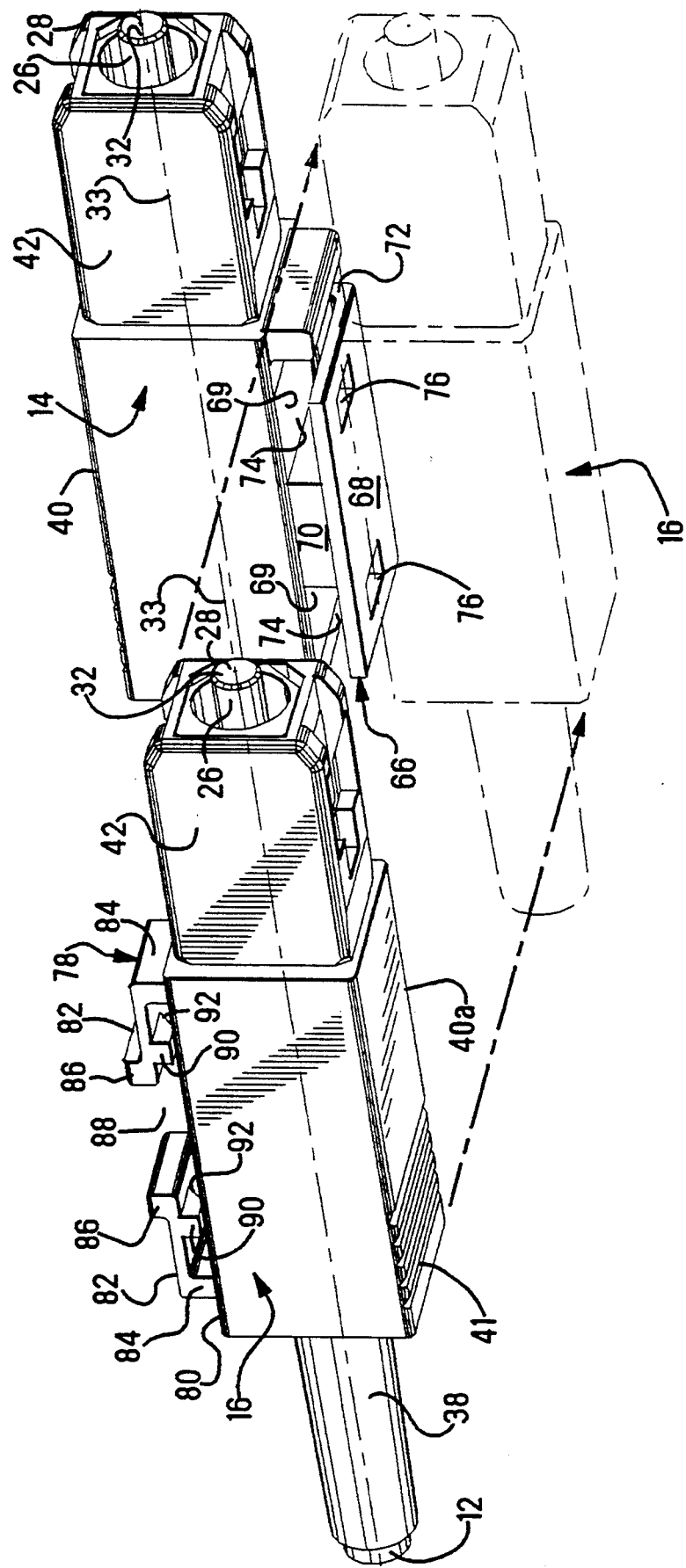
FIG. 2 is a perspective view showing how the housings of the connector are to be interconnected.

With reference to FIGS. 1 and 2, FIG. 1 shows a plug assembly 10 from a simplex fiber optic connector (not shown) that is attached to a fiber optic cable 12. These plug assemblies 10 fit within their respective housings, a first housing 14 and a second housing 16, which when interconnected holds the plug assemblies 10 in a side-by-side relation with float therebetween in a duplex-like connector 2. The float enables easy insertion and removal of the plug assemblies 10 from a receptacle housing 20 as a single unit. The receptacle housing 20 has a pair of integrally molded ports 22, each of which contains a sleeve 24 for aligning a ferrule 26 of the plug assembly 10, and an optical fiber 28 therein, with another fiber optic device (not shown).

These plug assemblies 10 are representative of an SC-type optical fiber connector available from the NTT (Nippon Telegraph and Telephone) International Corporation, Tokyo, Japan. While this is a push-pull type of connector, plug assemblies from other types of connectors may also be used.

The plug assembly 10 has a casing 30 that contains the ferrule 26 which extends from the front of the casing 30. The ferrule 26 has the optical fiber 28 from the fiber optic cable 12 contained therein and held coexistent with the face 32 of the ferrule 26. The ferrule 26 is adapted for limited linear movement along a longitudinal axis 33 and is biased forward by a spring (not shown) within the casing 30. The longitudinal axis 33 of this ferrule 26 is the same as that of the optical fiber 28. The casing 30 includes a pair of ribs 34 and a pair of raised pedestals 36 symmetrically located on opposite sides of the casings 30 that, in conjunction with the housing 14,16, as described below, capture the plug assembly 10.

The fiber optic cable 12 is attached to the plug assembly 10 at the rear of the casing 30 in a conventional manner that isolates the optical fiber 28 from any external shocks. A strain relief boot 38 surrounds the fiber optic cable 12 and is attached to the rear of the plug assembly 10 to prevent overbending of the optical fiber 28 as it enters the plug assembly 10.

Each of the housings 14,16 has a body 40, 40a and a nose 42 with a chamber 44 extending longitudinally therethrough. This chamber 44 is adapted to receive and retainably position the plug assembly 10 so that the ferrule 26 extends forwardly of the nose 42 (FIG. 2). The nose 42 has a rectangular tubular configuration with a pair of notched openings 48 extending through opposing sides. Each opening 48 has a front edge 50 and a rear edge 52 that interfere with the ribs 34 and the raised pedestals 36 respectively to prevent the plug assembly 10 from being dislodged from the chamber 44, while still permitting some axial displacement of the plug assembly 10 within the housings 14,16. A key 54 is incorporated onto the nose 42 ninety (90) degrees from the openings 48. The configuration of the key 54 may be altered to insure proper mating with a corresponding slot 55 of the receptacle housing 20.

At the front of the nose 42, on each side corresponding to the openings 48, is a pair of beveled lead-in surfaces 56 with corresponding following surfaces 58 therebehind. A channel 60 extends from the front of the nose 42, through these surfaces 56,58, to the opening 48. As the nose 42 is being inserted into the port 22, the beveled surfaces 56,58 and the channel 60 interact with corresponding resilient fingers 62, having catches 64 thereupon, to enable the catches 64 to pass over and then engage the ribs 34 of the plug assembly 10. Once engaged, the catches 64 ensure that the housings 14,16 and the plug assembly 10 with the optical fiber 28 therein, are retained within the port 22 of the receptacle housing 20.

The body 40,40a of each housing 14,16 is integrally formed with the respective nose 42. While this illustrates one possible configuration, it is also possible to have the nose be separate from the housing. Alternatively, the housings 14,16 may be adapted so that the plug assemblies 10 may be accepted having the nose 42 as part of the plug assembly 10 as opposed to being part of the housings 14,16. The body 40,40a is an elongate tubular member with a generally rectangular cross-section. The body 40,40a may be gripped to insert and remove the plug assemblies 10 from the receptacle housing 20 as a single unit. The outer surface of the body may have grip enhancing features, such as ribs 41, or some other roughened surface, disposed thereupon.

The first housing 14 has a retention member 66 on the body 40. The retention member 66 is a rectangular retention plate 68 that is generally parallel to one of the sides 69 of the body 40 and offset therefrom by a central post 70. An adjacent side of the body is extended outward to the edge of the retention plate 68, forming a base 72 therebetween (best seen in FIG. 1). This defines two open-ended U-shaped cavities 74 along the body 40 having the retention plate 68, the side of the body 69 and the base 72 as boundaries. These cavities 74 are separated by the central post 70 that extends between the body 40 and the retention plate 68 from the base 72 across most of the width of the retention plate 68. Windows 76 extend through the retention plate 68 and into each of the cavities 74.

The second housing 16 has a clasp member 78 thereon. The clasp member 78 is interconnectable with the retention member 66 to hold the first housing 14 and the second housing 16 in a side-by-side relationship with float therebetween. The float is a clearance between the clasp member and the retention member. Relative movement between the first and second housings is bounded by the retention member interfering with the clasp member. The clasp member 78 is a pair of resilient arms 82 that extend towards each other in a cantilevered manner from pedestals 84 located at opposite ends of the body 40a. Each resilient arm 82, includes a foot 86 opposite the pedestal 84. These feet 86 extend away from the body 40a of the second housing 16 and are spaced apart from each other to define a receiving region 88 that is further bounded by the resilient arms 82, the pedestals 84 and the side 80 of the body 40a. Extending into the receiving region 88 from along each of the resilient arms 82 is a detent 90. The detent 90 is configured to be received within the window 76 of the retention plate 68 when the clasp member 78 engages the retention member 66 to prevent the housings 14,16 from disengaging.

As shown in FIG. 2, the housings 14,16 are interconnected by placing the second housing 16 alongside and slightly above the first housing 14 so that the resilient arms 82 of the second housing 16 are receivable within the U-shaped cavities 74 of the first housing 14. In this position the retention plate 68 and the central post 70 of the first housing 14 are also positioned to correspond to the receiving region 88 of the second housing 16. By pushing down on the second housing 16 the cam surfaces 92 on the detents 90 come into contact with the retention plate 68, thereby deforming either the resilient arms 82, the retention plate 68 or both so that the detents 90 slide along the retention plate 68 down to the windows 76 where they are received and captivated therein to lock the housings 14,16 together.

An aspect of this invention is that the housings may remain separate from each other, or be separated from each other, to enable the housings and plug assemblies to be utilized as two simplex connectors. This embodiment of the invention makes this particularly attractive as there are no excess parts that might become lost when the housings are separate from each other. This is an especially useful feature where it would be advantageous to temporarily connect one optical fiber into a receptacle housing before the other is connected.

In addition, while the invention is described with reference to a duplex-like connector, it would also be possible to interconnect a greater number of plug assemblies into a string or a block by incorporating multiple clasp members, retention members or some combination thereof into the other sides of one of the housings 14,16. This string or block could then be thought of as a number of interconnected duplex-like connectors.

Figure 3:
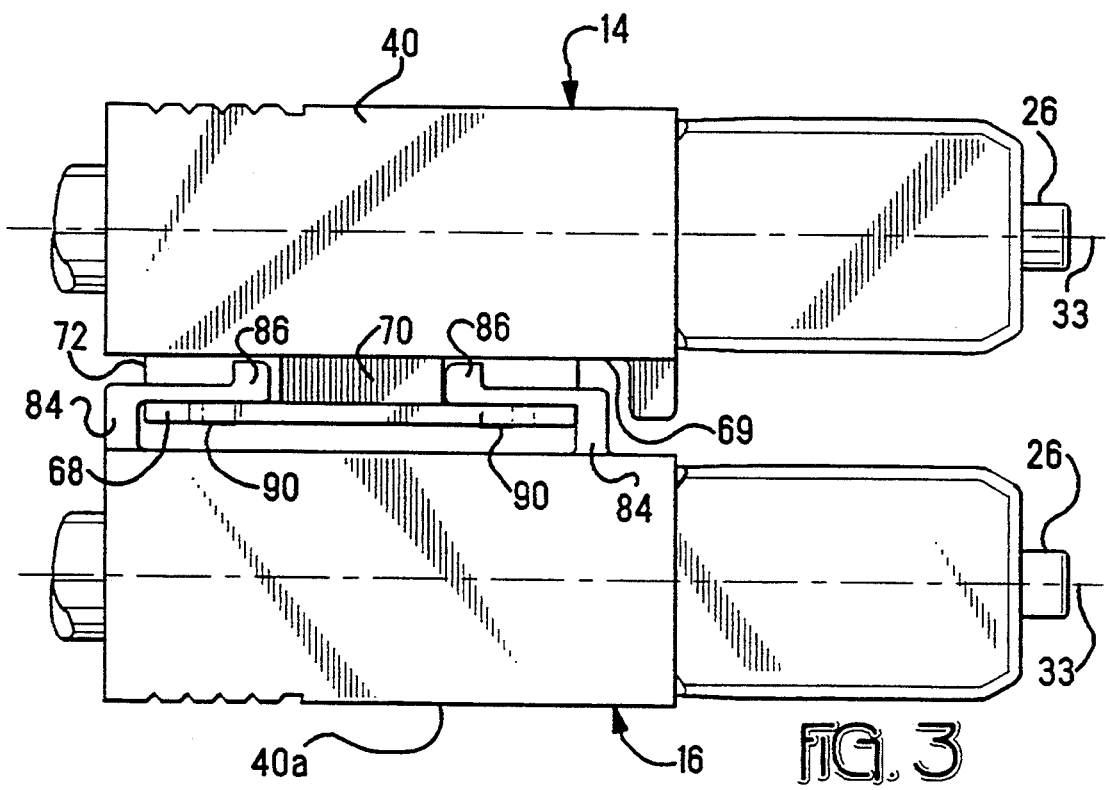
FIG. 3 is a top view of the interconnected housings in an uncompressed state.

Once interconnected, the feet 86 of the resilient arms 82 fit generally against the side 69 of the body 40 of the first housing 14, although some looseness is acceptable (FIG. 3). The distance the feet 86 extend away from the resilient arms 82 is selected so that the detents 90 are prevented from disengaging from the windows 76 as the housings 14,16 float relative to each other. The feet 86 also act to stabilize the housings 14,16 relative to each other by contacting the body 40 of the first housing 14 in two places through which the resiliency of the cantilevered arms 82 exerting a biasing force between the housings 14,16.

Figure 4:
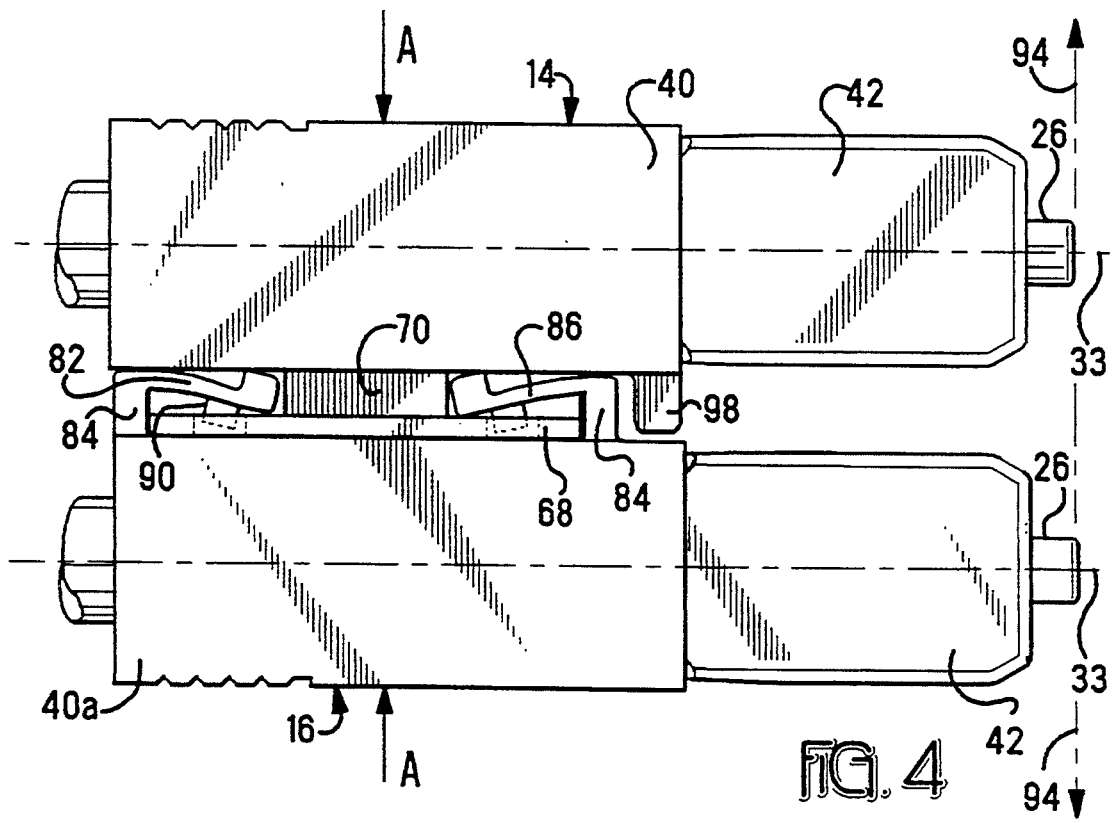
FIG. 4 is a top view of the housings in a uniformly compressed state illustrating a first form of relative motion between the interconnected housings.

The thickness of the retention plate 68 is selected so that when the feet 86 are against the body 40 of the first housing 14, the retention plate 68 is separated from the second housing 16 by a distance that is sufficient to accommodate any anticipated misalignment due to manufacturing tolerances. In this uncompressed state (shown in FIG. 3), the housings 14,16 are essentially at their extreme displacement from each other. It would also be possible to have the uncompressed state correspond to the nominal spacing where the housings 14,16 would be compressed or separated in order to accommodate any misalignment to mate with the receptacle housing 20. As seen in FIG. 4, when the first housing 14 and the second housing 16 are pressed together, the feet 86 remain against the body 40 of the first housing 14 and the retention plate 68 is moved closer to the body 40 of the second housing 16. The resilient arms 82 are deflected or deformed but the detents 90 remain engaged with the windows 76 due to the size of the feet 86. This enables the housings 14,16 to float in a translational manner relative to each other along a first axis 94 that is perpendicular to the longitudinal axis 33 of the ferrule 26 or optical fiber 28 as a result of compressing the housings 14,16 towards one another (Arrows A in FIG. 4). This movement may occur independent of motion along any other axis.

Figure 5:
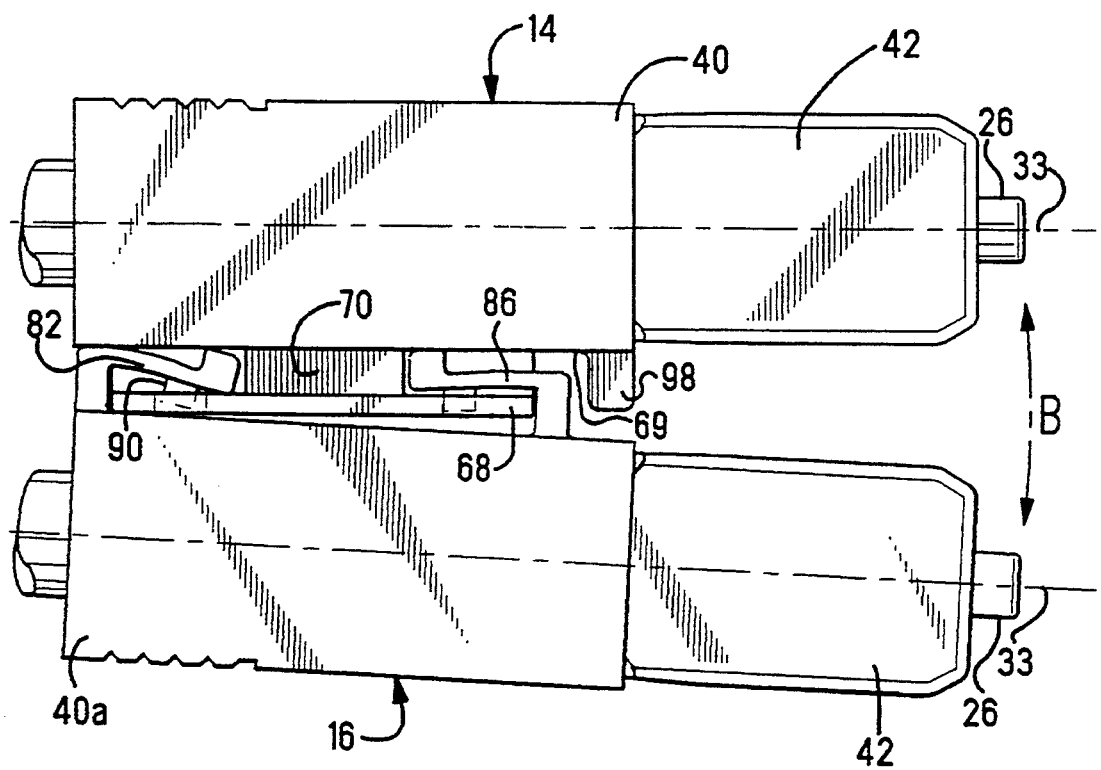
FIG. 5 is a top view of the housings in a pivotally compressed state illustrating a second from of relative motion between the interconnected housings.

It is also possible to angularly realign the longitudinal axis 33 of the ferrules 26 to accommodate any angular misalignment of the ferrule 26 with the mating sleeve 24. The noses 42 of the housings 14,16 may be pivoted towards each other or away from each other (Arrows B in FIG. 5) as the resilient arms are independent of each other. This will deform one of the resilient arms 82. Excessive nose-in orientation is prevented by a forward bumper 98 extending outward from the body 40 of the first housing 14 near the nose 42 from the same side 69 as the retention plate 68. When nose-in displacement occurs, the forward bumper 98 comes in contact with the body 40a of the second housing 16 to prevent excessive axial misalignment which might preclude the ferrule 26 from being received within the mating sleeve 24. In addition, this forward bumper 98 prevents overstressing of the rearward resilient arm 82.

With reference to FIGS. 5 and 10 through 12, a rearward bumper 98a similarly prevents excessive nose out orientation. The rearward bumper 98a extends outward from the body 40 of the first housing 14 on an end opposite the forward bumper 98 with the retention plate 68 therebetween. As the noses 42 pivot away from each other, the rearward bumper 98a engages the body 40a of the second housing 16 thereby preventing further pivoting. Limiting excessive nose out orientation prevents wedging of the noses 42 into their corresponding receptacles.

Figure 6:
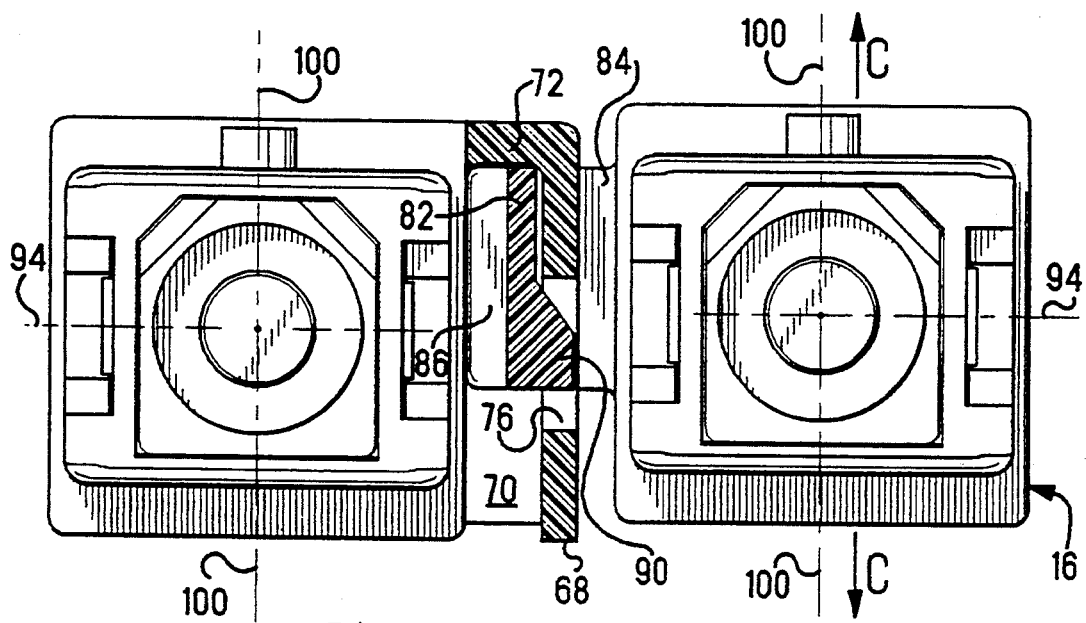
FIG. 6 is an end view of the housings offset vertically illustrating a third form of relative motion between the interconnected housings.

The window 76 in the retention plate 68 that receives the detent 90 is elongated vertically relative to the size of the detent 90, thereby enabling the detent 90 to move therein (FIG. 6). The movement of the detent within the window 90 permits the first housing 14 and the second housing 16 to float translationally along a second axis 100 that is perpendicular to both the first axis 94 and the longitudinal axis 96 of the ferrule 26 (shown as Arrows C in FIG. 6). The float along the second axis 100 may be limited either by having the resilient arms 82 interfere with the base 72 or by having the detent 90 contact the edges of the window 76.

Figure 7:
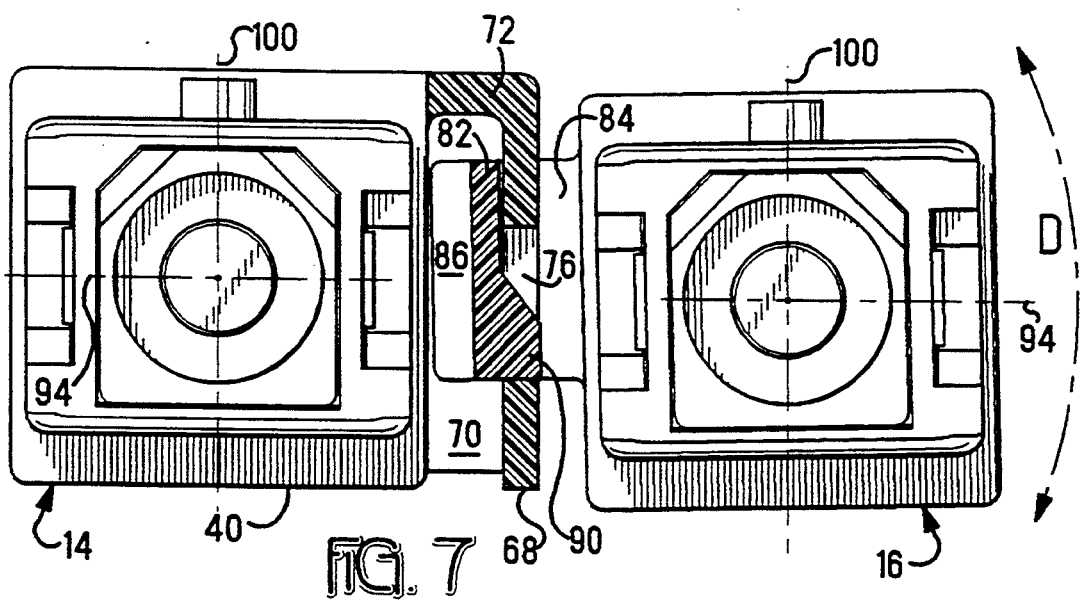
FIG. 7 is another end view of the housings showing one of the housings twisted illustrating a forth form of relative motion between the interconnected housings.

With reference to FIG. 2, 6 and 7 the interconnection of the clasp member 78 and the retention member 66 also provides the housings 14,16 and the plug assemblies 10 therein with limited rotational float about the longitudinal axis 33 by way of the resilient arms 82. Upon a twisting rotation of either housing 14,16 (Arrows D in FIG. 7), because the feet 86 are in contact with the body 40 of the first housing 14, the resilient arm 82 will twist slightly or the feet 86 will become partially disengaged from against the body 14.

Figure 8:
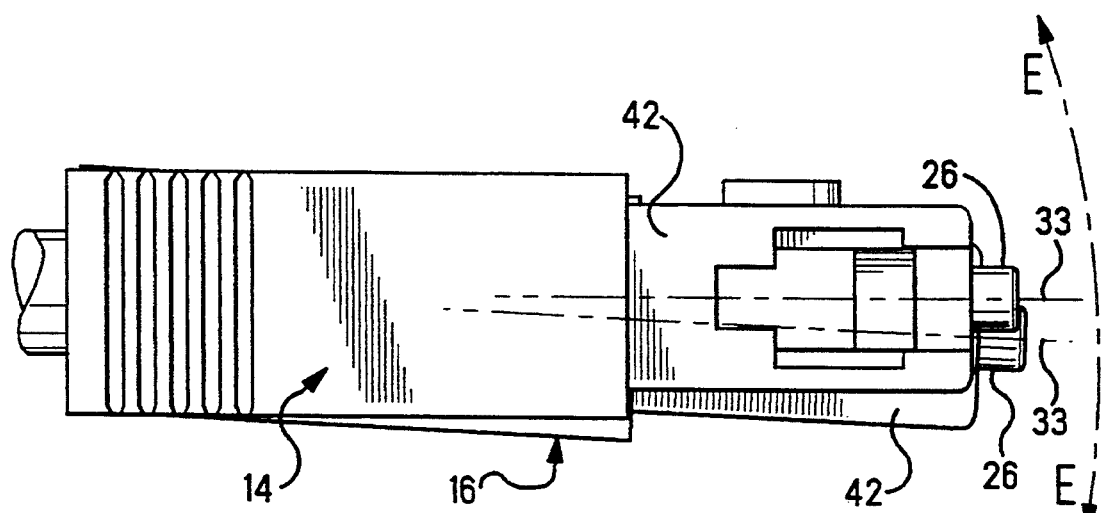
FIG. 8 is a side view of the housings showing one of the angularly offset illustrating a fifth form of motion between the interconnected housings.

If the windows 76 are also slightly larger than the corresponding width of the detent 90, the noses 42 of the housings 14,16 may also be pivoted up and down to accommodate any angular misalignment of the longitudinal axis 33 along the second axis 100 (shown as Arrows E in FIG. 8).

The portion of the receiving region 88 between the feet 86 of the two resilient arms 82 and the length of the retention plate 68 are sized to closely correspond to the width of the central post 70 and the spacing between the two pedestals 84 respectively (best seen in FIG. 3). This prevents linear displacement of the housings 14,16 along the longitudinal axes 33 maintaining structural rigidity between the two housings 14,16 to enable handling of the housings 14,16 as a pair. Any misalignment along these axes 33 is accommodated by the float inherent in the spring loaded ferrule 26. While float of the interconnection is discussed above primarily with reference to the housings 14,16, it should be noted that it is the alignment of the plug assemblies 10 and the ferrules 26 that are contained within the housings that is of principle importance.

Figure 9:
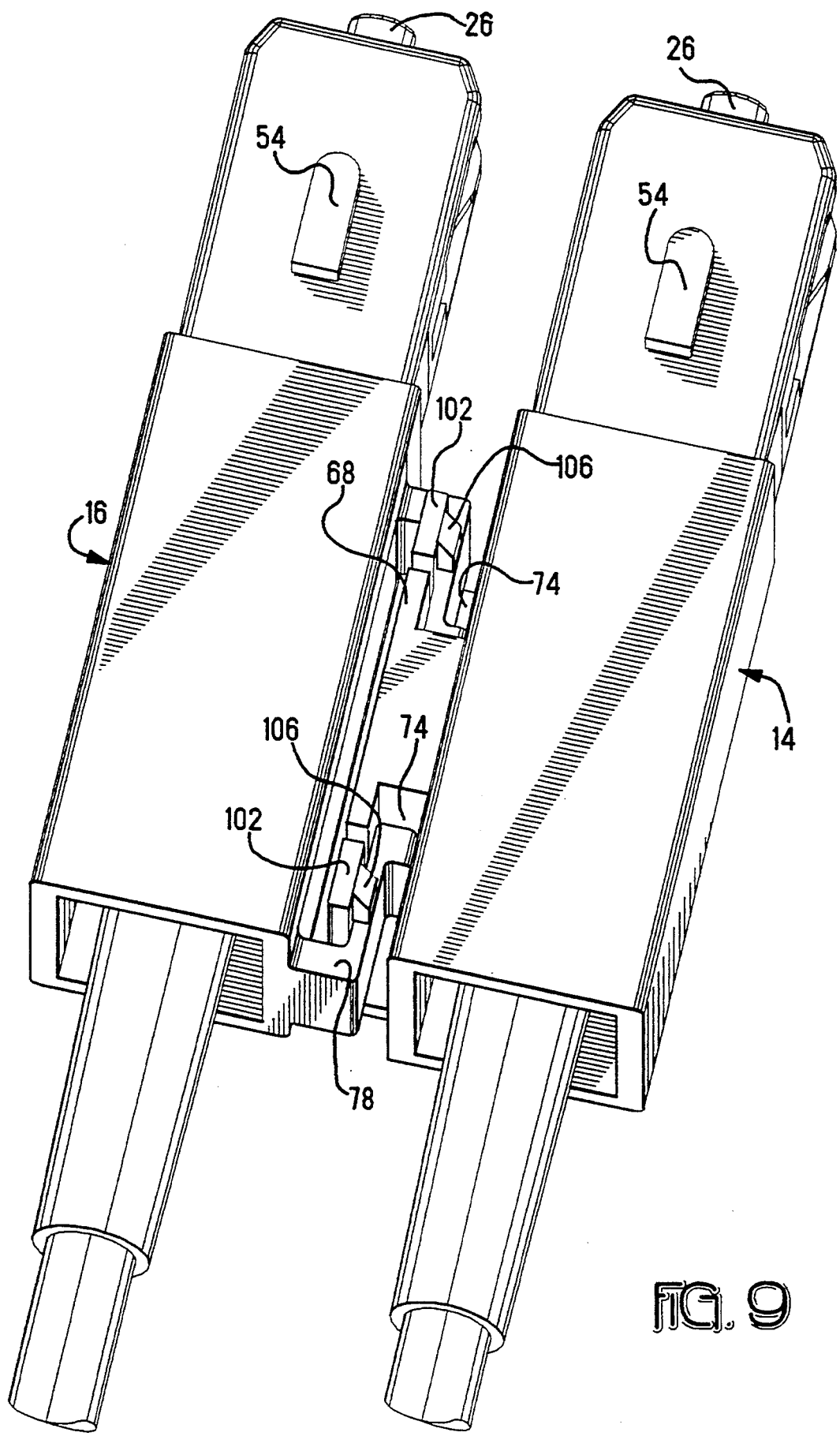
FIG. 9 is a perspective view of an alternative embodiment of the invention.
Figure 10:
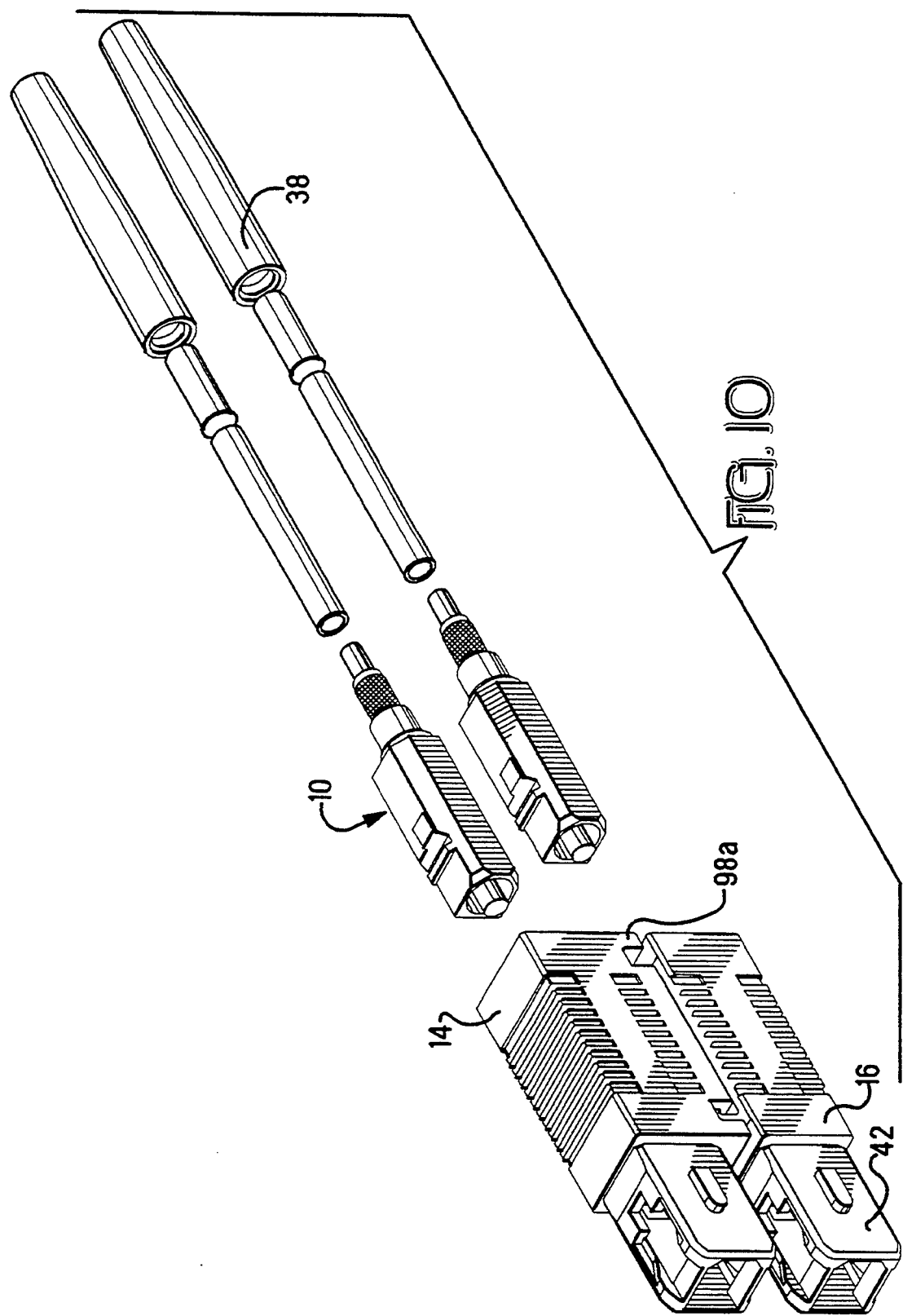
FIG. 10 is a perspective view of a first housing having a retention member and a rear bumper united with a second housing.
Figure 11:
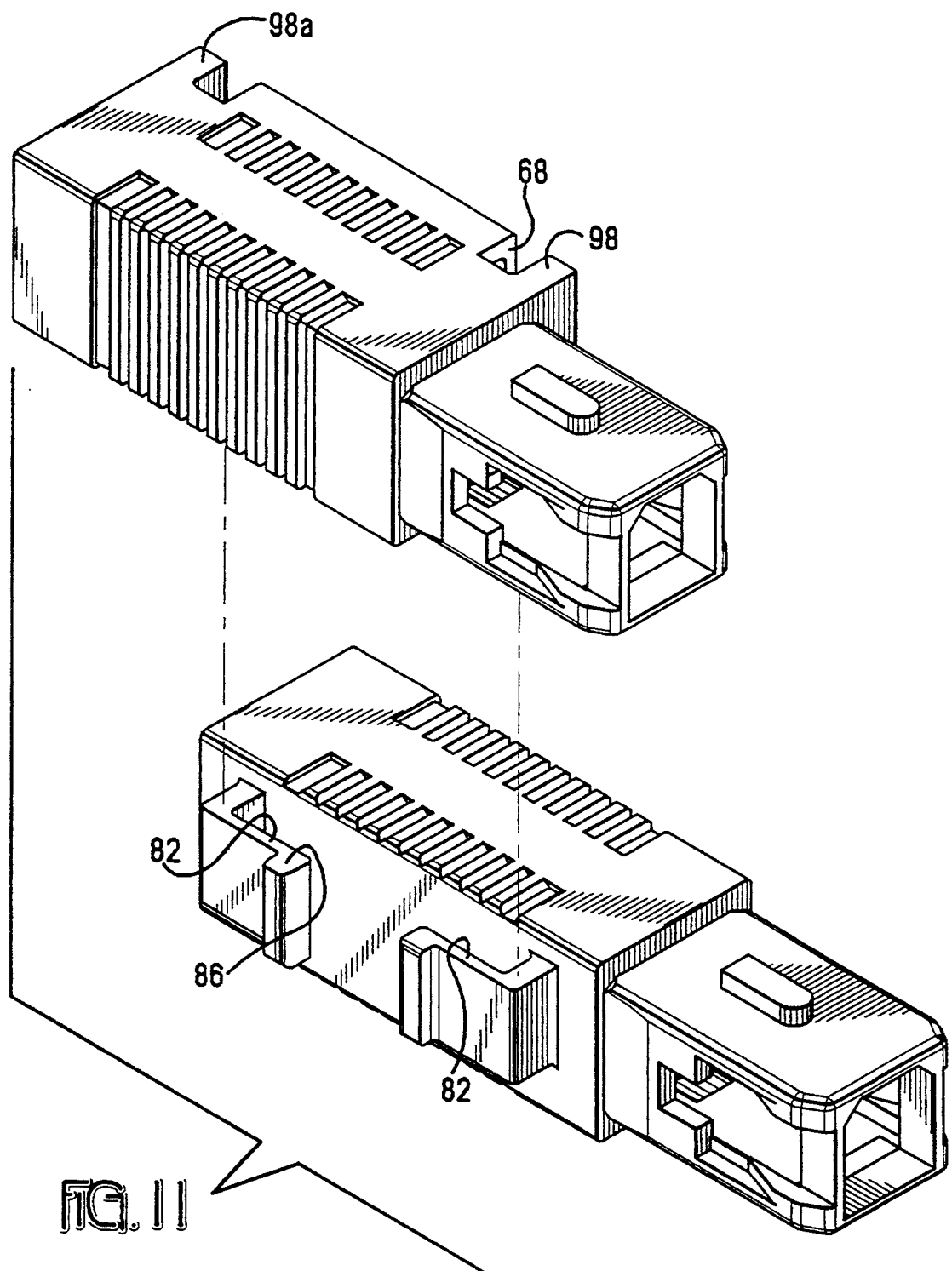
FIG. 11 is a perspective view of a first housing having a retention member separate from a second housing having a clasp member.

FIG. 9 shows an alternative embodiment of the invention. In this embodiment, the windows 76 have been removed from the retention plate 68 and the detents 90 have been removed from the clasp member 78. The detents 106 and on resilient fingers 102 at the end of the retention plate 68. These fingers 102 are formed by slicing partially across the retention plate 68 into the corresponding cavity 74. The clasp member 78 is engaged as described above and prevented from disengaging by the detents 106 which overlie the clasp member 78.

In the above described embodiments, the clasp member 78 functioned to both hold the housings 14,16 together and exert a biasing force therebetween to stabilize the housings 14,16 due to the resiliency of the arms 82. It would be possible to bifurcate those functions into two separate elements. For example, the retention member 66 could be an elongate T-shaped member or a pair of headed posts and the clasp member 78 could have corresponding key-shaped slot or slots to loosely receive the retention member 66 to hold the housings together and provide the desired float. The biasing force between the two housings 14,16 could be exerted by separate elements such as spring arms. Furthermore, in the above described embodiments, the clasp member 78 and the retention member 66 do not have moving parts, instead relying on manipulation of the housings 14,16 to effect the interconnection, it may be desirable to have a clasp member 78 or some part thereof that is separably movable relative its housing 16 to engage the retention member 66 or vice versa.

The retention member 66 and the clasp member 78 are shown in the drawings as integral components of the first housing 14 and the second housing 16 respectively. As shown, the housings 14,16, including their respective clasp member and retention member, may be economically molded from a commercially available engineering thermoplastic, for example polyester. A specific example of an acceptable material being VALOX DR-48 of General Electric Plastics in Pittsfield, Mass. Other materials and manufacturing techniques may also be appropriate depending on the physical manifestation of the invention. However, either the retention member 66, the clasp member 78 or parts thereof may be separately manufactured and then incorporated into their respective housing 14,16. This may be desirable where the clasp member 78 engages the retention member 66 to provide the float for the housings 14,16 and separate members are used to exert a biasing force between the housings.

It will be appreciated that the present invention has significant advantages for connecting the plug assemblies of fiber optic connectors in a side-by-side relationship to form a duplex-like connector with float between the plug assemblies. It should be recognized that the above described embodiments, and suggested alternatives, constitute only the presently preferred form of the invention and that the invention may take on numerous other forms, only some of which have been expressly described above. Accordingly, the invention should be only limited by the scope of the following claims.

We claim:

1. An apparatus for maintaining plug assemblies of optical fiber connectors in a side-by-side relation with float therebetween, comprising:
a first housing having a chamber for retainably receiving one of the plug assemblies and a retention member, a second housing having a chamber for retainably receiving one of the plug assemblies and a clasp member wherein the clasp member loosely engages the retention member to hold the housings in a side-by-side relationship with float therebetween wherein, said float is a clearance bounded by said clasp member interfering with said retention member.

2. The apparatus of claim 1, wherein the retention member is a retention plate affixed to the first housing and offset therefrom and the clasp member is a pair of resilient arms that extend from the second housing and enclasp the retention plate.

3. The apparatus of claim 2, wherein the retention plate includes a window and at least one of the resilient arms includes a detent that is retainably received within the window when the housings are interconnected.

4. The apparatus of claim 2, wherein the retention plate includes a detent that prevents the resilient arms from disengaging the retention member.

5. The apparatus of claim 1, wherein the housings are elongate tubular members.

6. The apparatus of claim 1, wherein the retention member is integrally formed with said first housing.

7. The apparatus of claim 1, wherein the clasp member is integrally formed with said second housing.

8. The apparatus of claim 1, wherein at least one of said first and second housings is made of plastic.

9. The apparatus of claim 1, wherein at least one of said first and second housings has a grip enhancing feature.

10. The apparatus of claim 1, wherein at least one of said first and second housings has a forward bumper thereon.

11. The apparatus of claim 1, wherein at least one of said first and second housings has a rearward bumper thereon.

12. A duplex fiber optic connector; comprising:
first and second plug assemblies;
a first housing having a chamber wherein said first plug assembly is retainably received therein, and a retention member;
a second housing having a cheer wherein said second plug assembly is retainably received therein and a clasp member; wherein, the clasp member captures the retention member to hold the housings in a side-by-side relationship with float therebetween wherein, said float is a clearance bounded by said clasp member interfering with said retention member.

13. The apparatus of claim 12, wherein the retention member is a retention plate affixed to the first housing and offset therefrom and the clasp member is a pair of resilient arms that extend from the other housing and enclasp the retention plate.

14. The apparatus of claim 13, wherein the resilient arms exert a biasing force between the housings.

15. A duplex fiber optic connector system for maintaining plug assemblies of a fiber optic connector in a side-by-side relation to enable simultaneous mating with sleeves of a receptacle housing, comprising:
first and second housings, each housing having a chamber wherein one of the plug assemblies is retainably received; wherein said first housing has a retention member and said second housing has a clasp member and further wherein the clasp member captures the retention member holding the housings in a corresponding side-by-side relationship with float therebetween wherein, said float is a clearance bounded by said clasp member interfering with said retention member.

16. An apparatus for maintaining plug assemblies of optical fiber connectors in a side-by-side relation with float therebetween, comprising:
a first housing having a chamber for retainably receiving one of the plug assemblies and a retention member wherein the retention member is a retention plate affixed to the first housing and offset therefrom, said retention plate including a window, and
a second housing having a chamber for retainably receiving one of the plug assemblies and a clasp member wherein the clasp member is a pair of resilient arms having a detent, said resilient arms extending from the second housing, said window receiving said detent to hold the housings in a side-by-side relationship with float therebetween wherein, said float is clearance bounded by said clasp member interfering with said retention member.

* * * * *

UNITED STATES PATENT AND TRADEMARK OFFICE
CERTIFICATE OF CORRECTION

PATENT NO. : 5,386,487
DATED : January 31, 1995
INVENTOR(S) : Robert C. Briggs, et al.

It is certified that error appears in the above-indentified patent and that said Letters Patent is hereby corrected as shown below:

Column 9, line 9, claim 12, "cheer" should be --chamber--.

Signed and Sealed this

Fourth Day of April, 1995

*Attest:*

BRUCE LEHMAN

*Attesting Officer*   *Commissioner of Patents and Trademarks*